United States Patent [19]
Terrell

[11] Patent Number: 5,720,420
[45] Date of Patent: Feb. 24, 1998

[54] FIXING ASSEMBLY

[76] Inventor: Christopher Edward Terrell, 24 Lancaster Road, Wimbledon, London, Great Britain

[21] Appl. No.: 542,844

[22] Filed: Oct. 13, 1995

[30] Foreign Application Priority Data

Oct. 14, 1994 [GB] United Kingdom ............... 94 20 722

[51] Int. Cl.$^6$ ............................................. B62J 7/02
[52] U.S. Cl. ........................... 224/452; 224/447; 403/389
[58] Field of Search ........................... 224/412, 419, 224/425, 441, 448, 452, 453, 571; 248/229.15, 229.25, 68.1; 403/389, 391, 396, 398; D12/407

[56] References Cited

U.S. PATENT DOCUMENTS

| | | | |
|---|---|---|---|
| 673,037 | 4/1901 | Swank et al. | 403/391 |
| 870,242 | 11/1907 | Meech | 403/391 |
| 888,313 | 5/1908 | Cook | 403/391 |
| 1,256,824 | 2/1918 | Olson | 403/391 |
| 1,674,569 | 6/1928 | Rauch | 224/571 |
| 1,979,091 | 10/1934 | Alsaker et al. | 403/396 |
| 3,982,304 | 9/1976 | Menshen | 248/68.1 |
| 4,537,338 | 8/1985 | Belka | 224/452 |
| 5,271,588 | 12/1993 | Doyle | 248/68.1 |

FOREIGN PATENT DOCUMENTS

| | | | |
|---|---|---|---|
| 599725 | 1/1926 | France | 224/39 R |
| 3405144 | 8/1985 | Germany | 224/32 A |
| 1067377 | 6/1964 | United Kingdom . | |
| 1187397 | 3/1967 | United Kingdom . | |

*Primary Examiner*—Henry J. Recla
*Assistant Examiner*—Gregory W. Vidovich
*Attorney, Agent, or Firm*—Antonelli, Terry, Stout, & Kraus, LLP

[57] ABSTRACT

An assembly for securing rod-like members 51, 52 in the fabrication of structures such as racks for carrying goods on bicycles, luggage trolleys and lighting support systems, etc. A moulded plastic base 45 has slots 82 defined therein arranged to receive substantially U-shaped members 54, 55. Each U-shaped member has a wall portion and a base portion defining wall edges and a base edge. Rod-like members are locatable against wall edges of said U-shaped members and held in place by a fixing device such as a threaded bolt. The bolt extends through the moulded plastic base and thereby facilitates secure attachment of two rods to a plastic base or to an appropriate base material.

12 Claims, 6 Drawing Sheets

FIXING ASSEMBLY

FIELD OF THE INVENTION

The present invention relates to an assembly for securing a rod-like member. The present invention also relates to a load carrying rack having rod-like members and suited for mounting a bicycle.

BACKGROUND OF THE INVENTION

Many fixing assemblies are known for securing rod-like members in which the rod-like member will subsequently form a structural component of a much bigger assembly.

For example, a fixing assembly for a rod-like member is disclosed in U.K. Patent Publication 2,041,063. In this disclosure, the fixing assembly takes the form of a metal strip, having a bush threaded at one end and an aperture defined at the opposing end, arranged to receive said bush. The metal strip is folded so as to define a frame and the bush is received within the aperture. A rod-like member may then be inserted within the frame and secured to said frame by means of a screw or similar device.

A problem with this known device is that the manufacturing process for defining the metal strip is quite involved. As can readily be appreciated, if the metal strip is to provide a resilient fixing, a significant amount of force is required in order to bend it into its desired shape. Furthermore, although capable of securing a single rod-like member, problems are still encountered in terms of securing the rod-like member to another object. Thus, for example, if two rod-like members are inserted within the strip, it is unlikely that sufficient resilience will be provided to torsional forces, and it is likely that any fastening of reasonable size would tend to become dislodged.

SUMMARY OF THE INVENTION

According to a first aspect of the present invention, there is provided an assembly for securing a rod-like member, comprising substantially U-shaped members each having wall portions and a base portion defining wall edges and a base edge, wherein said rod-like member is locatable against one of said wall edges; a second rod-like member is locatable in juxtaposition with said first securable rod-like member; and a fixing device is insertable between said first securable rod-like member and said second rod-like member so as to force said rod-like members towards said base edge.

An advantage of the present invention is that it can be fabricated from parts machinable using modest tools. Thus, the device lends itself to fabrication in environments with limited resources or under hostile conditions. Furthermore, when disassembled, the components have modest space requirements. Furthermore, once secured, the assembly is resilient to the application of tensional forces, compressive forces, shear forces and torsional forces.

In a preferred embodiment, two U-shaped members are positioned such that said fixing device is insertable between said U-shaped members. Preferably, said U-shaped members are defined as substantially flat elements locatable within slots defined within a base member. In this way, the fixing device may be inserted through said base member so as to be secured against said base member.

The assembly is particularly suitable for use in the fabrication of carrying racks, such as load carrying racks mountable on bicycles.

According to a second aspect of the present invention, there is provided a bicycle having a front wheel, a rear wheel and a frame, a load carrying rack mountable above said rear wheel, said rack comprising a load carrying platform and rod-like members securable to said platform for attaching said rack to said bicycle frame, wherein each rod-like member is secured to said platform by a securing assembly, comprising substantially U-shaped members each having wall portions and a base portion defining wall edges and a base edge, wherein a first rod-like member is locatable against one of said wall edges; a second rod-like member is locatable in juxtaposition with said first rod-like member; and a fixing device is insertable between said rod-like members and through a portion of said load carrying rack, so as to force said rod-like members towards said base edge.

In a preferred embodiment, a rack base has a plurality of fixing assemblies mounted thereon, each arranged to secure rod-like members so as to define a structure. In addition, similar fixing assemblies may be provided so as to allow said structure to be attached to the bicycle frame, possibly at the point where the rear wheel is secured to said frame.

Preferably, the rod-like members include notches, so that co-operating notches are aligned and said fixing device is inserted through said aligned notches.

DETAILED DESCRIPTION OF THE PREFERRED EMBODIMENTS

Preferred embodiments will now be described with reference to a specific application of the securing assembly, when used in the fabrication of a bicycle carrying rack. However, it will be appreciated that the fixing assembly may be used in many other applications, with modifications made to the scale of the assembly as so required.

Figure 1:
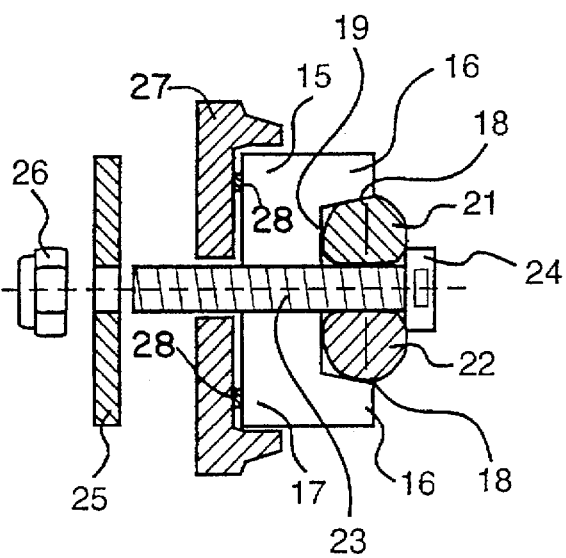
FIG. 1 is a cross-sectional view, taken along line I—I of FIG. 2, showing an assembly for securing rod-like members, having a pair of substantially U-shaped members and a fixing device.
Figure 2:
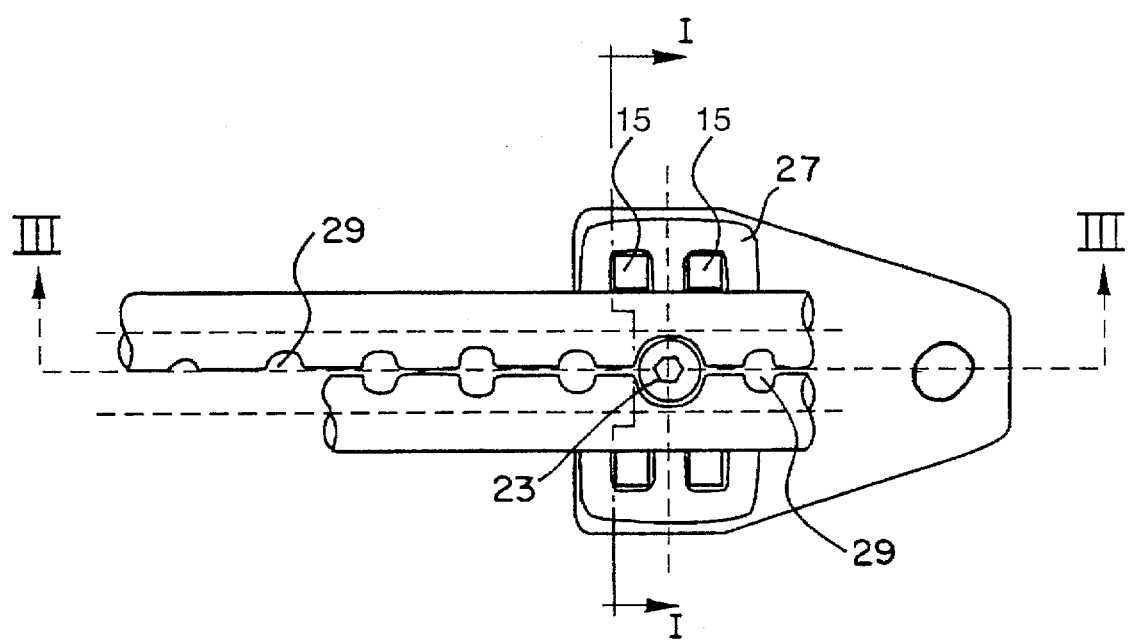
FIG. 2 is a fragmentary plan view of the fixing assembly shown in FIG. 1.

A fixing assembly is shown in FIG. 1 and is generally configured to facilitate the fixing of three components. The fixing assembly includes two substantially U-shaped members 15, spaced apart as shown in FIG. 2. Each U-shaped member 15 has wall portions 16 and a base portion 17, defining wall edges 18 and a base edge 19 respectively.

A first rod-like members 15 21 is located within the U-shaped member along with a second rod-like member 22. Depending upon the application, one of said rod-like members 21, 22 may extend to be locatable against other parts of a structure, while the other rod-like member may be similarly locatable or, alternatively, it may be of shorter length so as to provide a complete securable assembly for the first rod-like member, as illustrated in FIG. 1.

A fixing device in the form of a bolt 23 is inserted between the rod-like members 21, 22 such that a head 24 of the bolt forces the rod-like members towards the base edges 19 of said U-shaped members 15. As shown in FIG. 1, the size of the U-shaped members is such that the rod-like members 21, 22 will lodge against the wall edges 18 of the U-shaped members as they are forced towards the base edges 19 of said U-shaped members. Thus, forces applied to said rod-like members 21, 22 are directed against the walls of said U-shaped members 15.

The bolt 23 extends beyond the U-shaped members 15 and is located through a base member 27 and to attach rod-like members 21, 22 to said base member via a washer 25 a securing nut 26. If desired, the U-shaped members 15 can be secured to base member 27 as by welds 28.

An alternative view of the securing device shown in FIG. 1 is illustrated in FIG. 2. As shown in FIG. 2, the rod-like members include a series of notches 29, such that the bolt 23 is locatable within a co-operating pair of said notches. Thus, the rod-like members 21, 22 are resiliently held by the bolt 23 but at the same time the position of said rod-like members 21, 22 may be adjusted provided that notches 29 in each of said members are in alignment at the position at which the bolt 23 engages.

Figure 3:
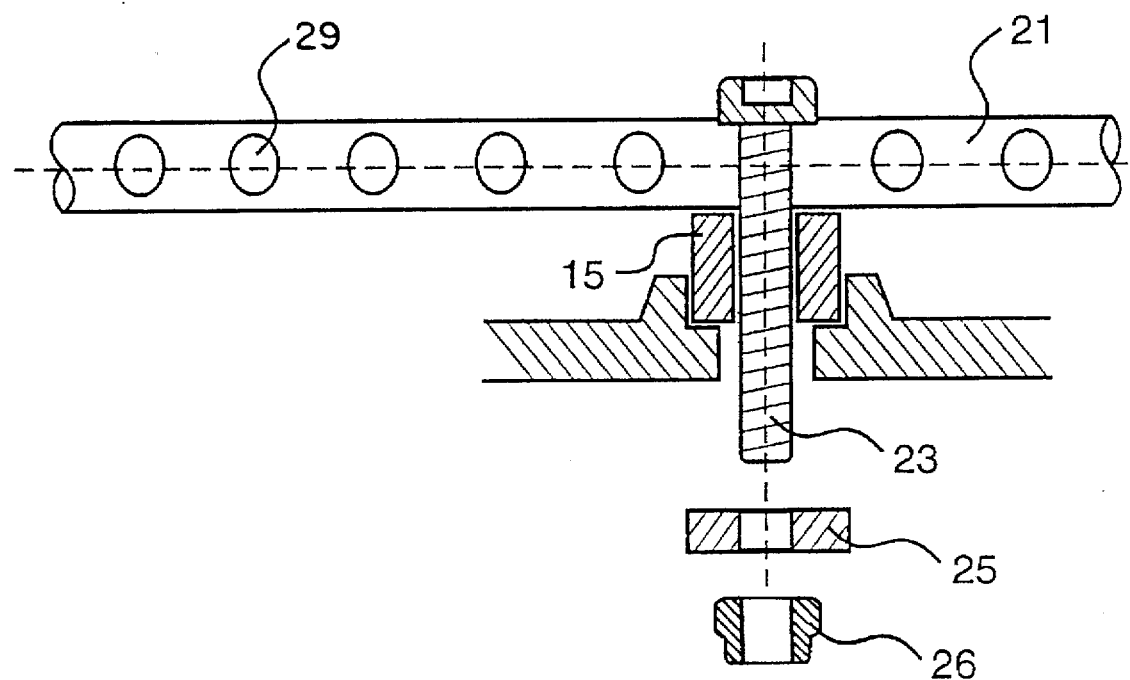
FIG. 3 shows a cross section taken along line III—III of FIG. 2.

The profile of notches 29 is illustrated in FIG. 3, which is a cross section along line III—III.

Figure 4:
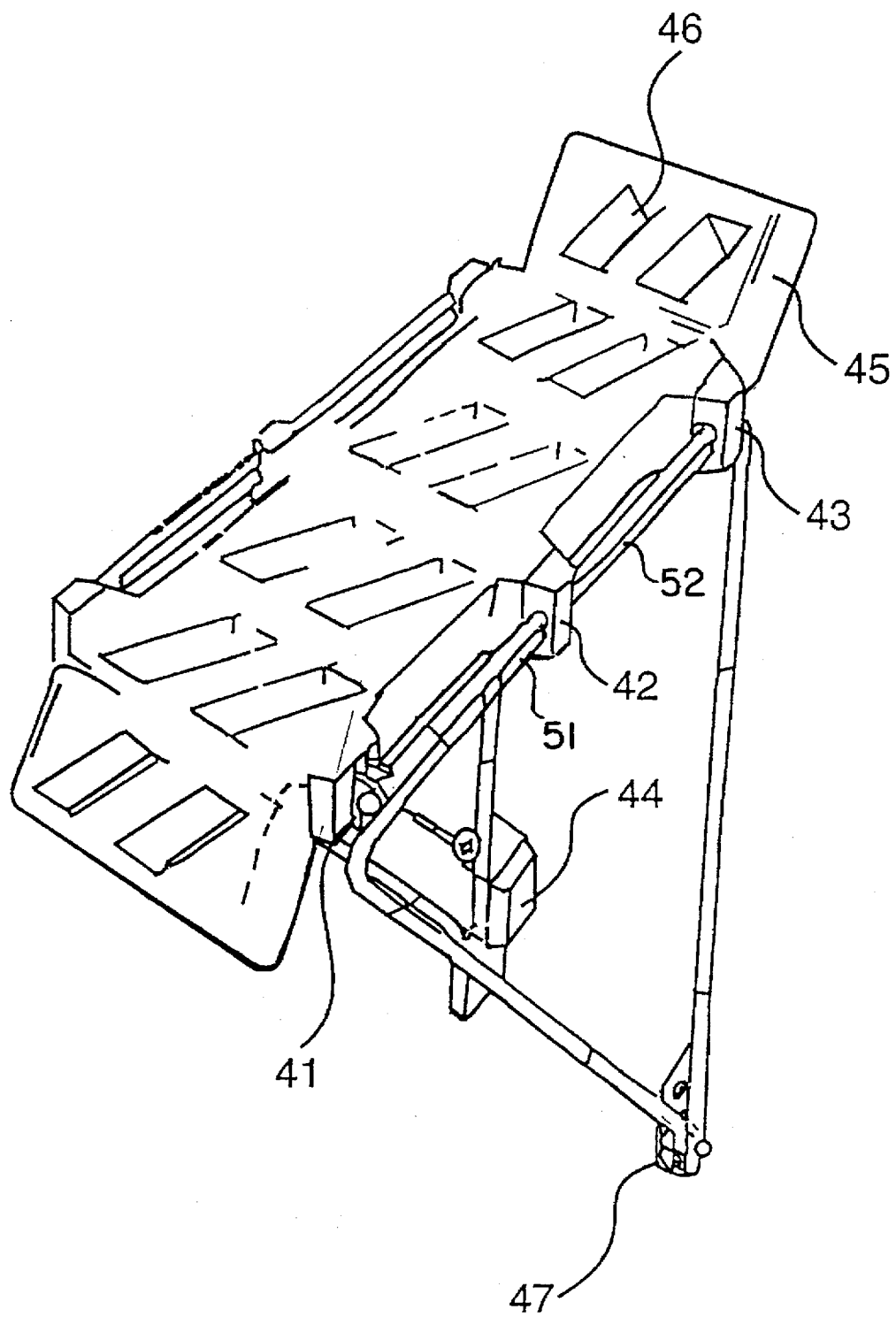
FIG. 4 shows a bicycle carrying rack, having fixing assemblies of the type shown in FIG. 1.

Application of the securing device to a bicycle carrying rack is shown in FIG. 4. Fixing assemblies of the type shown in FIGS. 1 to 3 are provided at a plurality of positions on the carrying rack, including positions 41, 42 and 43. Once located, the protruding elements of each fixing assembly are covered by a protecting cap 44.

Figure 5:
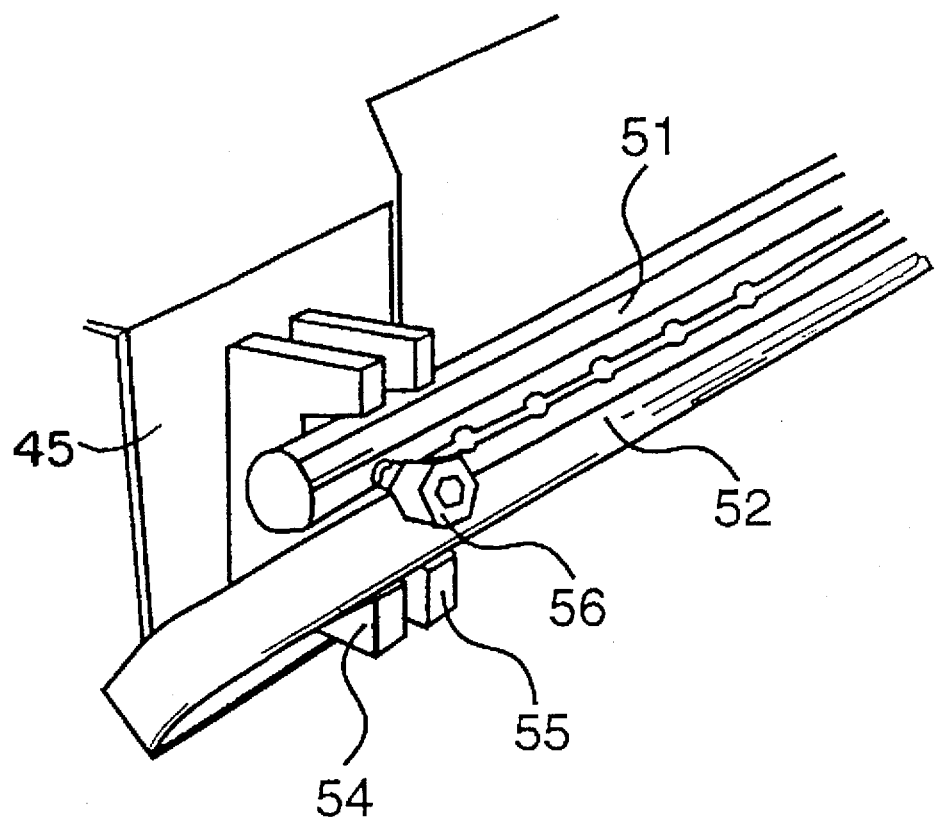
FIG. 5 shows details of the fixing assembly of the type shown in FIG. 1 being used on the bicycle rack shown in FIG. 4.

Fixing assembly 41 illustrated in FIG. 4 is detailed in FIG. 5. A first solid and substantially cylindrical aluminium rod 51 is secured against a second similar rod 52. A base platform 45 consists of a plastic moulding, having a plurality of voids 46 therein so as to reduce its overall weight. The base platform 45 is moulded with slots defined therein arranged to receive U-shaped members identified as 15 in FIG. 1 and shown specifically as 45 and 55 in FIG. 5. The U-shaped members 54, 55 may be cast or, preferably, machined from mild steel plate, such that the level of working is minimal. In this way, even the most intricate components of the assembly may be engineered using modest workshop facilities.

Figure 7:
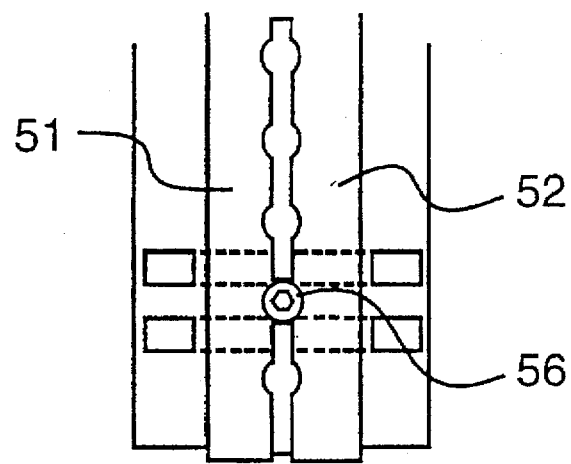
FIG. 7 is another view of the detail shown in FIG. 6.

Referring to FIG. 4, the rods 51, 52 define a substantially triangular structure, each rod defining two sides of said triangle, with an overlapping region being provided where the rods are fixed against the platform. The rods are then connected at a co-operating corner of the triangle and held together by a similar fixing assembly 47, detailed in FIG. 7.

Returning to FIG. 5, a bolt head 56 is shown, which is secured to a co-operating nut or similar tapped bush within the platform 45, by means of an allen key. If preferred, the bolt head 56 may have a slot or star for application of a suitable screwdriver or said head may have suitable flat edges, defining a square or a hexagon for example, for application of a suitable spanner.

In normal applications, the bolt would be tightened to such an extent that it makes a slight indention into the notches formed in the aluminium rods.

Figure 6:
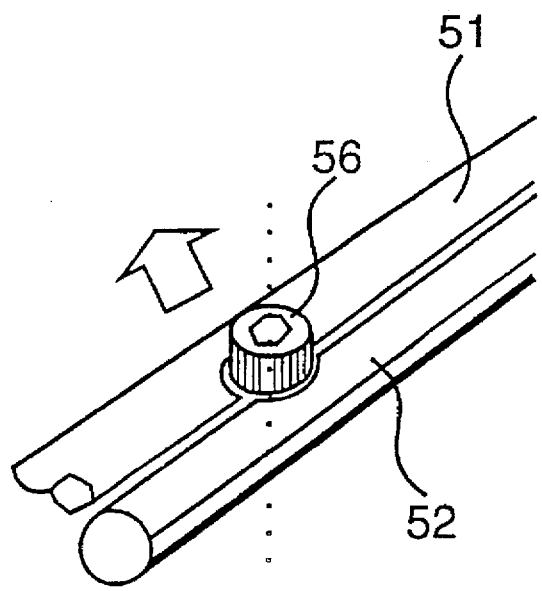
FIG. 6 shows a detail of the fixing assembly shown in FIG. 5.

The position of the bolt head 56 with respect to the rod-like members 51 and 52 is also detailed in FIG. 6. Thus, it can be appreciated that upon tightening the bolt by application of a suitable allen key etc., the rods 51 and 52 are forced towards the base of the U-shaped members 54, 55, 56 thereby bringing them closer together due to the angle of the wall portions. Thus, when tightened, forces are exerted upon the rods 51 and 52 which are directed towards the wall portions of the U-shaped member 54, 55 which in turn are supported by the base platform 45.

Figure 8:
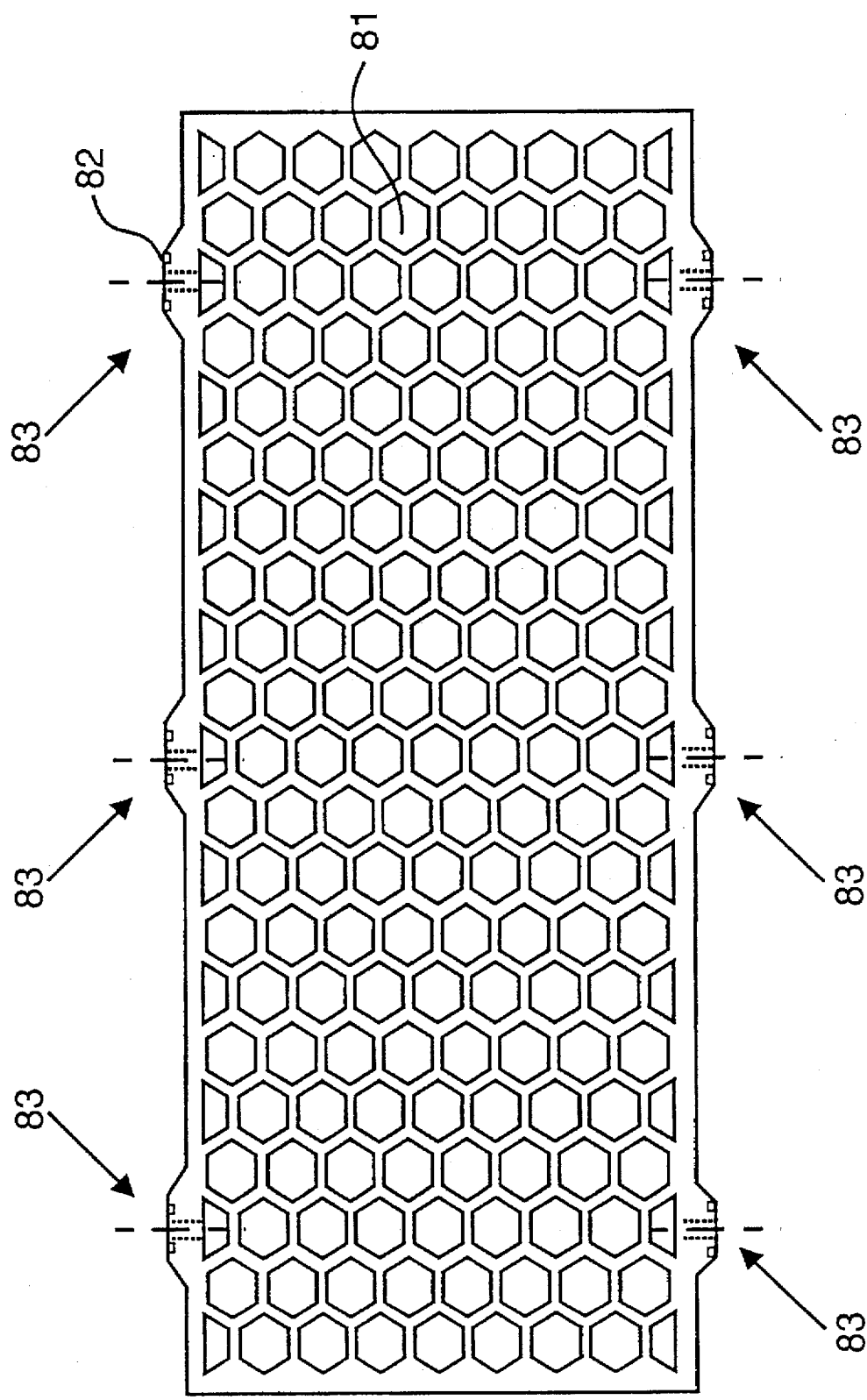
FIG. 8 details an alternative arrangement for a bicycle carrying rack.

It is desirable in the bicycle application to reduce the weight of the structure while retaining its rigidity. An alternative moulding for the platform 45 is shown in FIG. 8 in which the internal space of the platform itself is defined by a substantially honeycombed arrangement 81. Slots 82 are moulded within the platform structure, thereby facilitating the application of fixing assemblies at positions 83.

The use of fixing assemblies of the type shown in FIG. 1 for fabricating a bicycle rack provides an advantage to the effect that the component parts may be flat-packed and, when so packed, take up minimal space for transportation purposes and display purposes. Thus, transportation costs are reduced when compared to similar devices having welded structures.

The device facilitates assembly without requiring complex machined parts. Furthermore, the securing devices themselves are substantially similar, thereby reducing the component count and facilitating intuitive assembly once the mode of operation has been appreciated on the part of the assembler. Thus, it is readily appreciated that anyone with a modest appreciation of bicycle mechanics would easily be in a position to assemble the device. Furthermore, the construction is inherently flexible in that the position of the rods may be easily adjusted prior to the fixing bolts being finally secured. Thus, it is envisaged that a modest range of products would allow racks of the type illustrated in FIG. 4 to be applied to a wide range of bicycle sizes.

The fixing assembly described herein has many other applications in addition to its application in a bicycle carrying frame. For example the assembly could be used to fabricate a lightweight luggage trolley, a lighting support system or boating systems, including sailboats and motorboats etc.

What is claimed is:

1. An assembly for securing rod-like members to a base member, using a bolt member having a bolt head and a thread portion extending from the bolt head, and a threaded member tightenable on the thread portion, said assembly comprising a plurality of substantially flat U-shaped members, each U-shaped member having wall portions and a base portion attached to said wall portions, said wall portions and said base portion respectively defining wall edges and a base edge, such that:

a first rod-like member is locatable against one of said wall edges;

a second rod-like member is locatable in juxtaposition with the first rod-like member; and the bolt member is insertable between the first rod-like member and the second rod-like member to extend between a pair of said U-shaped members and through the base member when said base portions of said U-shaped members are respectively inserted into recesses in the base member, so as to secure the bolt member head against the rod-like members and to force the rod-like members toward said base edge as the threaded member is tightened on the bolt member and against the base member.

2. An assembly according to claim 1, including two U-shaped members.

3. An assembly according to claim 1, wherein said U-shaped members and the base member are formed of similar material, and said U-shaped members are adapted to be welded to the base member.

4. A structural assembly, comprising a plurality of rod-like members, a base member having recesses therein, and a plurality of fixing assemblies securing said rod-like members to said base member so as to define a structure, each fixing assembly comprising a plurality of substantially flat U-shaped members, a bolt member having a bolt head and a thread portion extending from said bolt head, and a threaded member tightenable on said thread portion, each U-shaped member having a pair of wall portions and a base portion attached to said wall portions, said wall portions and said base portion respectively defining wall edges and a base edge, said base portion inserted into one of the recesses in said base member, wherein in each fixing assembly:

- a first one of said rod-like members is located against one of said wall edges;
- a second one of said rod-like members is located in juxtaposition with said first one of said rod-like members; and
- said bolt member is inserted between said first one of said rod-like members and said second one of said rod-like members and extends between said U-shaped members and through said base member, with said bolt member head secured against said rod-like members and forcing the rod-like members toward the base edge, and with said threaded member tightened on said bolt member and against said base member.

5. An assembly according to claim 4, wherein said base member comprises a load carrying platform, and additional rod-like members extend from said platform.

6. An assembly according to claim 5, further comprising additional fixing assemblies fixing said additional rod-like members against said load carrying platform.

7. An assembly according to claim 5, wherein said load carrying platform is adapted to be attached to a bicycle.

8. An assembly according to claim 4, wherein said rod-like members have notches, such that co-operating notches are aligned and said bolt member is inserted through said aligned notches.

9. A load carrying rack for mounting above the rear wheel on a bicycle having a front wheel, a rear wheel and a frame, said load carrying rack comprising a load carrying platform, a plurality of rod-like members, and a plurality of securing assemblies securing said rod-like members to said platform, said rod-like members adapted for attaching said rack to the bicycle frame, each securing assembly comprising a plurality of substantially flat U-shaped members, a bolt member having a bolt head and a thread portion extending from said bolt head, and a threaded member tightenable on said thread portion, each U-shaped member having wall portions and a base portion defining wall edges and a base edge, wherein:

- a first one of said rod-like members is located against one of said wall edges;
- a second one of said rod-like members is located in juxtaposition with said first one of said rod-like members; and
- said bolt member is inserted between said first one of said rod-like members and said second one of said rod-like members and extends between said U-shaped members and through said platform, with said bolt member head secured against said rod-like members, and through a portion of said load carrying platform, so that said bolt head is secured against said rod-like members and said threaded member is tightened on said thread portion and against said platform.

10. A load carrying rack according to claim 9, wherein each securing assembly includes two U-shaped members.

11. A load carrying rack according to claim 9, wherein said U-shaped members are located within recesses within said platform.

12. A bicycle rack according to claim 9, further comprising an additional plurality of fixing assemblies for mounting said rack to the bicycle frame.

* * * * *